United States Patent [19]

Hayes et al.

[11] Patent Number: 4,713,770

[45] Date of Patent: Dec. 15, 1987

[54] SYSTEM AND METHOD FOR PREVENTING TOOL BREAKAGE

[75] Inventors: Michael L. Hayes, Chicago; Paul S. Mahr, Lockport; John W. Tippie, Naperville, all of Ill.

[73] Assignee: Kinetic Systems Corporation, Lockport, Ill.

[21] Appl. No.: 725,038

[22] Filed: Apr. 19, 1985

[51] Int. Cl.$^4$ .................... G06F 15/46; G05B 19/18
[52] U.S. Cl. .................... 364/474; 364/148; 364/183; 318/565; 318/567
[58] Field of Search .................... 364/148, 152–154, 364/178–179, 183–185, 468, 474–475, 507–508, 550–551; 318/561, 565, 567–568, 601; 73/104

[56] References Cited

U.S. PATENT DOCUMENTS

| | | | |
|---|---|---|---|
| 4,442,494 | 4/1984 | Fromson et al. | 73/104 X |
| 4,456,960 | 6/1984 | Wakai | 364/474 |
| 4,536,849 | 8/1985 | Borisch et al. | 364/550 |
| 4,551,808 | 11/1985 | Smith et al. | 364/474 |
| 4,608,644 | 8/1986 | Kiya | 364/474 |
| 4,608,645 | 8/1986 | Niwa et al. | 364/474 |

Primary Examiner—Gary V. Harkcom
Attorney, Agent, or Firm—James G. Staples

[57] ABSTRACT

A system for the detection of broken and worn machine tools which may be employed to protect machine tools using one or more machine tool bits and an automatic sequence of machining instructions comprising one or more machining steps. Piezoelectric load cells translate the force applied between the machine tool bit and the workpiece into electrical signals, one of which is selected, sampled, and processed into a series of force values by an analog module, one average force value for every revolution of a machine tool spindle. For the first pass on a first workpiece by a particular machining operation, force value maxima are learned for each machining step, and broken and worn tool force limits are calculated from these force maxima for each machining step. During this learn pass, each recorded force value is compared against predetermined learn ceiling in order to protect the machine tool. During successive passes on subsequent workpieces wear limits are calculated based on the force maxima of the learn pass and break limits are calculated based on the force maxima of the preceding pass. Whenever a learn ceiling, wear limit or break limit is exceeded, the system commands the machine to cease its cutting operation. To increase accuracy, the force values are sampled several times during one spindle revolution and are averaged. A graphing utility may optionally be employed to plot average force value versus revolution number.

10 Claims, 14 Drawing Figures

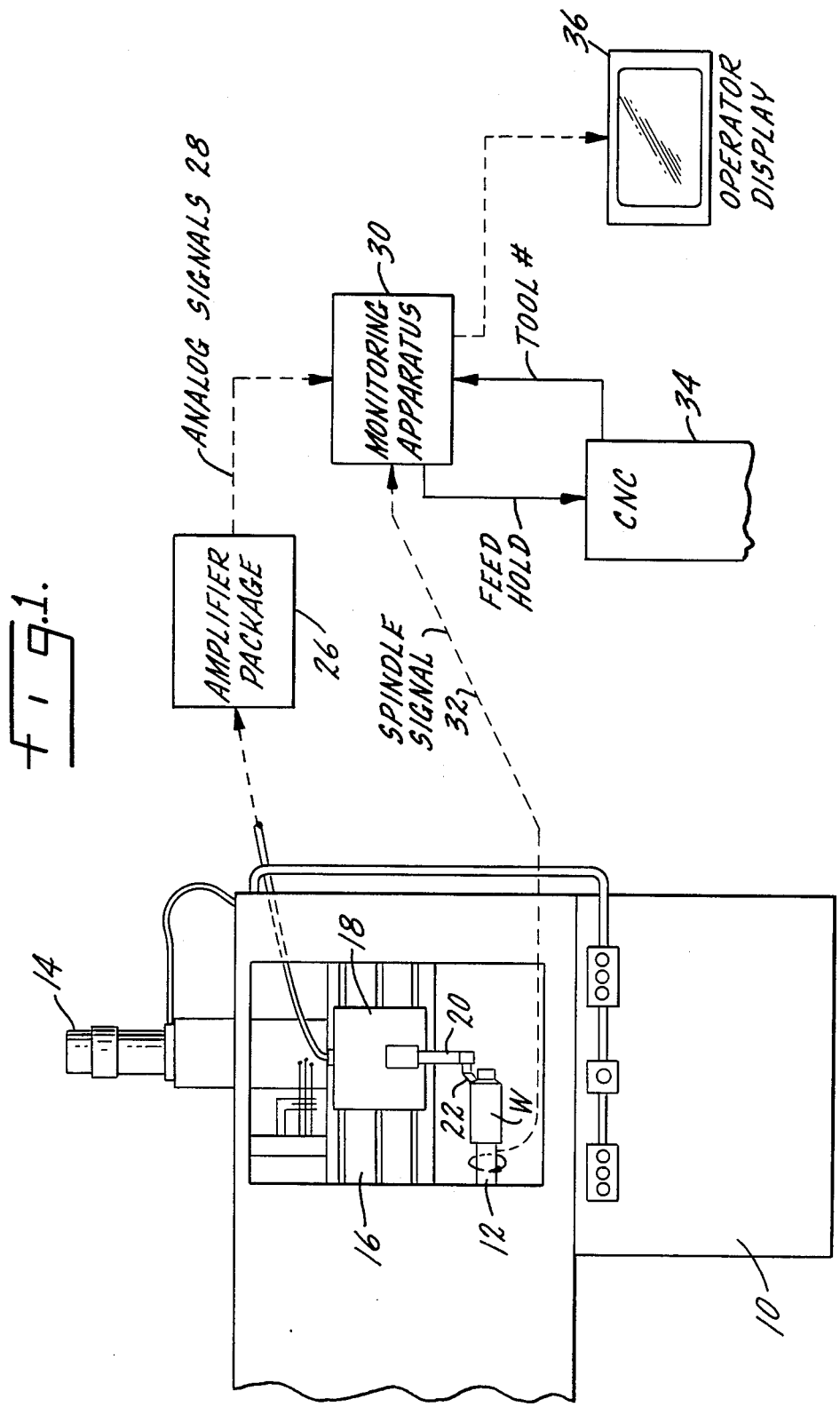

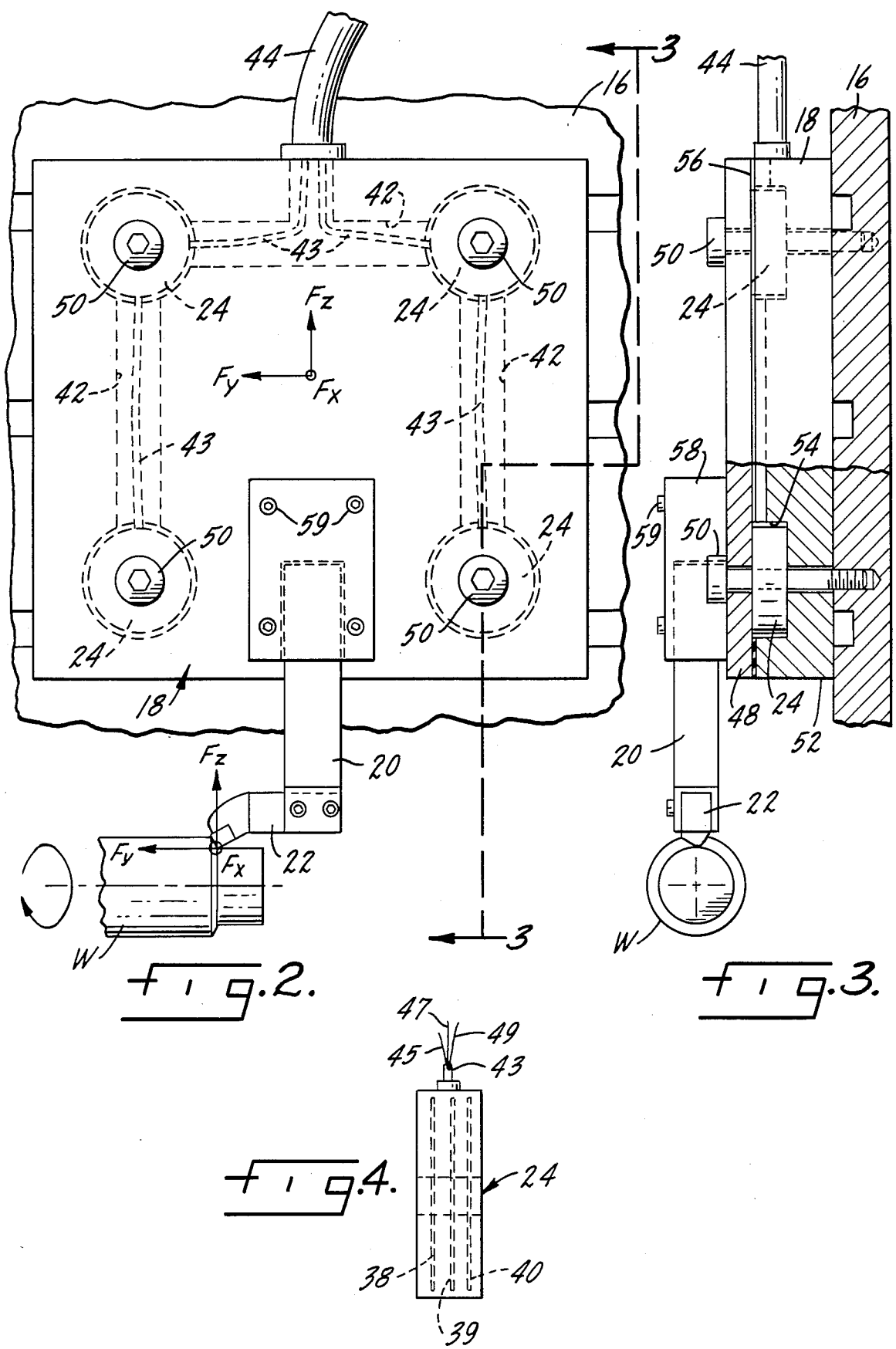

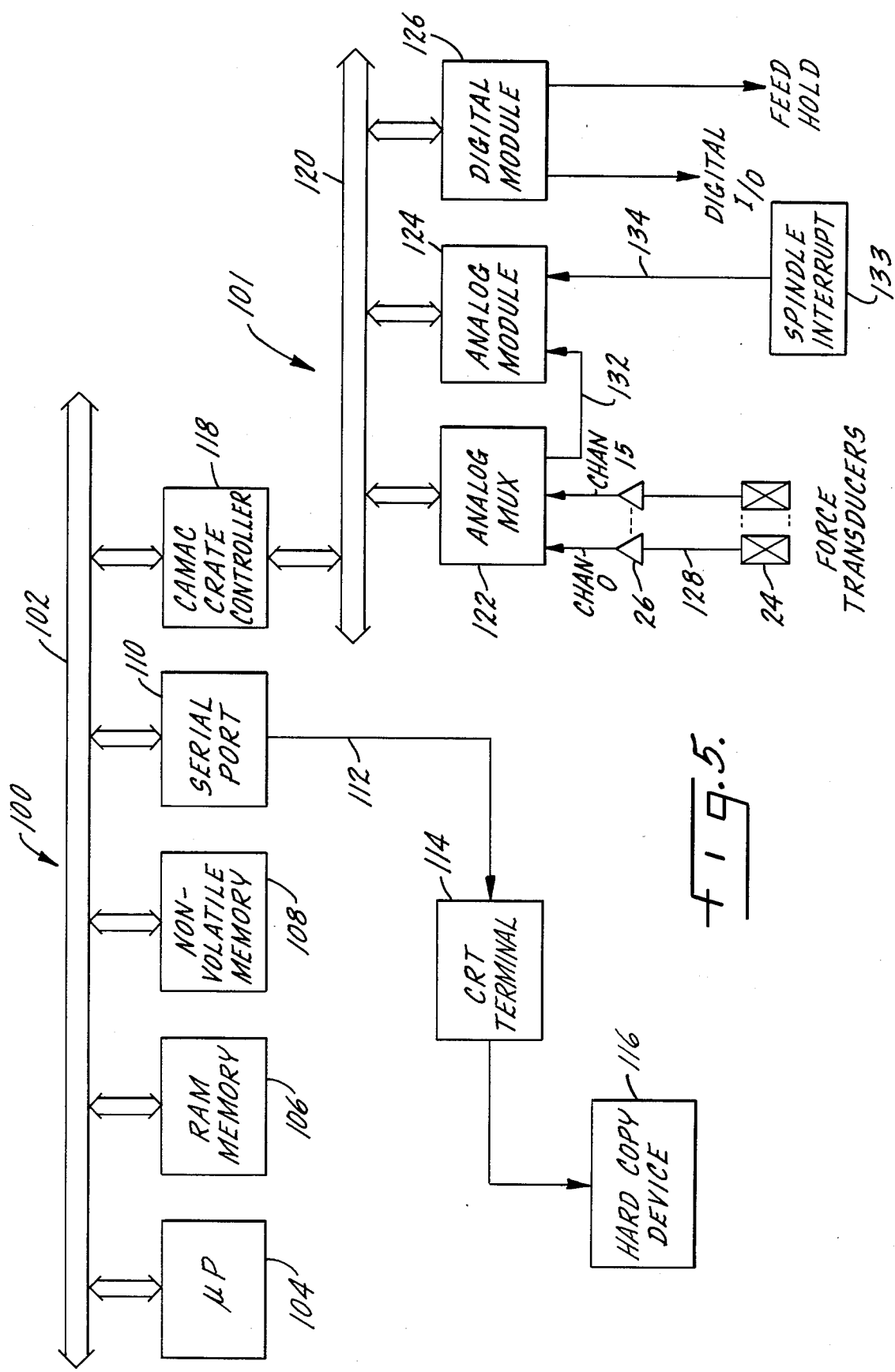

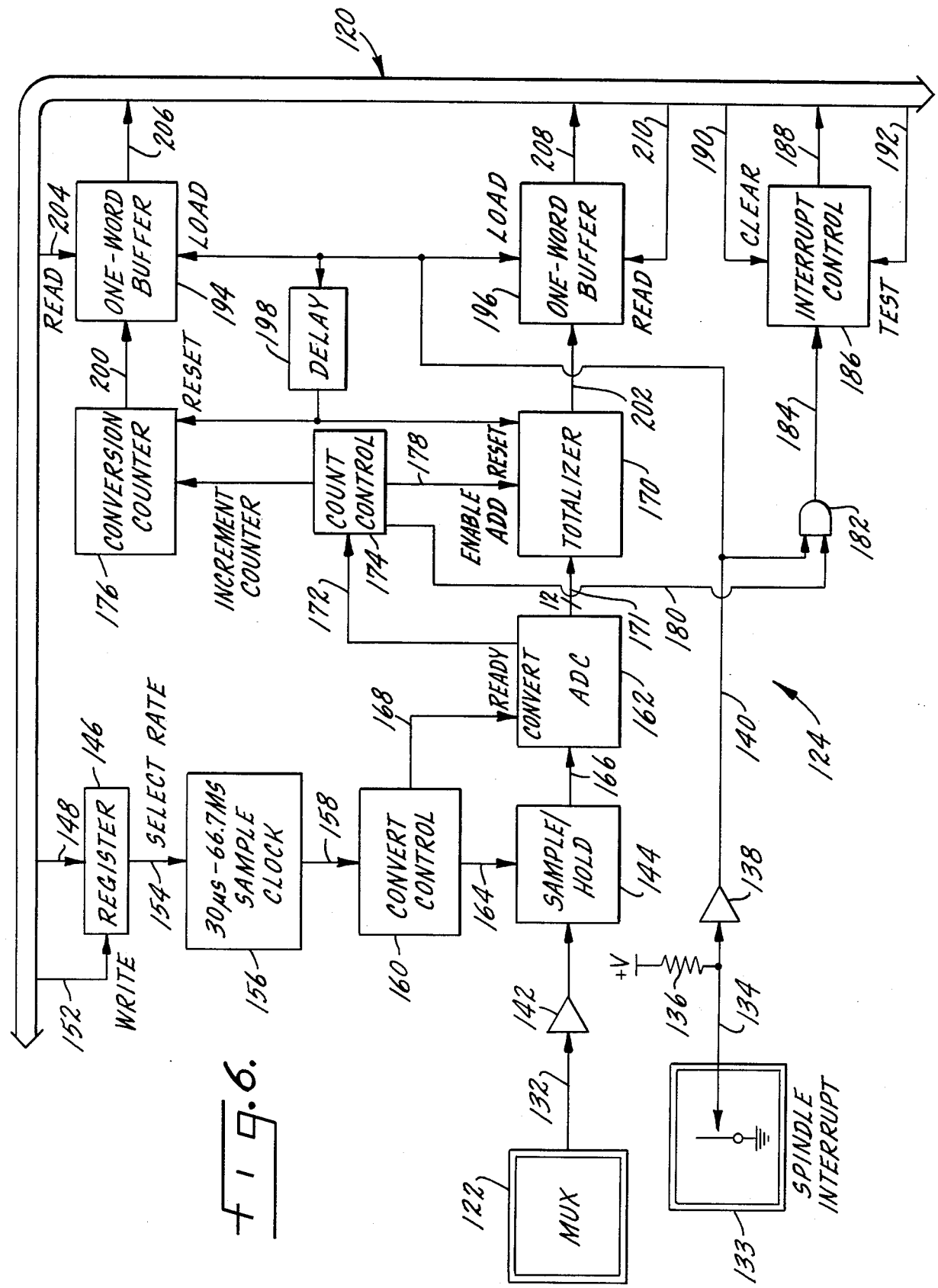

SYSTEM AND METHOD FOR PREVENTING TOOL BREAKAGE

BACKGROUND OF INVENTION

This invention relates generally to machine tools, and more specifically to a system and apparatus for detecting worn or broken machine tools.

Automated machine tools, such as those used in turning gears, can be quite expensive devices which therefor advantageously employ methods and systems designed to minimize structural damage to them.

Several types of machine tools, including drilling and turning machine tools, operate at very high rotational speeds, sometimes exceeding 8000 revolutions per minute. Such high rotational speeds necessitate an apparatus which can detect a broken machine tool very quickly, so that incipient wear or breakage can be detected before significant damage can occur to the tooling machine on which the drill bit or rotating spindle is mounted. It is also desirable to quickly detect worn machine tool bits in order to assure a uniform high quality in the workpieces produced.

One method of detecting a worn or broken machine tool bit is based on the fact that for a machine tool drive system that drives the machine tool bit down on or into a workpiece, the force exerted by the machine tool on the workpiece will increase as the machine tool bit wears or breaks.

Typically, an automatic machine tool system comprises a mounting for the workpiece, a stationary member on which a carriage is movably mounted, and one or more machine tool bits mounted on the carriage in a way so that the bits may properly machine the workpiece. One method of detecting the force applied to the tool bit onto the workpiece is to incorporate piezoelectric transducer cells in the mounting of the tool bit to the carriage. Stresses placed on these load cells are translated into voltages across the cells, which are amplified and transmitted to an analog/digital converter. The analog/digital converter in turn supplies digital data, including information as to the intensity of the signal received and therefor the force applied to the load cell(s), to a calculator means. This force is then compared by the calculator means against a previous stored force limit to determine whether or not the machine tool bit has reached the end of its useful life. While the method described herein uses load cells placed in the tool mounting arrangement, it is obvious that these sensing transducers can be placed in any location that senses the forces between the tool and workpiece. One such embodiment would incorporate the transducers in the spindle bearings. Also other transducer types (strain gauges, etc.) could be used to sense the forces.

In the prior art, one of the more advanced systems for detection of machine tool wear or breakage is the PROMESS system, marketed in this country by Semtronics, P.O. Box 748, Brighton, Mich. 48116. This broken tool detection system is designed for operation with an automatic turning tool that uses several machining steps in an operation on a particular workpiece. For each of the machining steps, the receiving computer determines a normal force which occurs during the cut, and then calculates a tool break force limit by multiplying that average force by a predetermined constant. The break force limit thus calculated is valid for the remainder of only that particular machining step. In the PROMESS system, each machining step, whether or not such machining step may be a repetition of an earlier machining step, requires a separate tool break force limit calculation. One drawback of this system is that there is a short period of time from the beginning of a cut in any one machining step and the establishment of a tool break force limit for that step in which the machine is not protected against a tool breakage except for a manually set overload limit. If a tool breaks within this beginning period, the computer may allow damage to the machine tool system.

An additional problem unsolved by prior art involves the significant range of forces during rotation of the workpiece. This is generally caused by a variation in diameter with rotational position due to imperfection in the workpiece.

SUMMARY OF THE INVENTION

The present invention solves one of the drawbacks of prior art broken machine tool detection systems by the separate calculation of a worn machine tool bit force limit for all of a series of the same machining step, and the calculation of a machine tool break limit based on a similar machining step prior to the current step. To protect the machine tool bit on the first pass, a learn ceiling is entered for each machining step by the operator on the basis of previous machining experience. If the forces generated during the machining operation on the first workpiece exceed a learn ceiling for a corresponding machining step, the computer will issue a command to shut down the machine tool drive means.

Meanwhile, the computer assembles a series of force arrays from the first pass, one array for each machining step. As it fills these force arrays, the computer keeps track of the largest force value in each array.

At the end of the first pass, the computer will have calculated, for each machining step within the pass, a machine tool breakage limit based on the greatest force array member and a break limit constant, and a worn tool force limit based on the same greatest force array member and a worn tool force limit constant.

The worn tool force limits thus established are valid for all successive repetitions of the machining operation. However, the broken tool force limits thus established are valid only for the next pass of the operation. This is because the force associated with a broken tool will evidence itself as a spike exceeding the last known greatest force recorded for the prior similar machining step.

Thus, the worn tool force limit for any particular step will be established at one value for all successive similar machining steps, and will eventually be exceeded as the force necessary to perform that machining step gradually increases. On the other hand, the broken tool force limit may be established at a relatively low value at the beginning, but will gradually increase in step with the greatest force value array member in the last pass for that particular machining step. In this way, protection against damage resulting from tool breakage can be obtained for both early and late passes of the machine tool operation; a machine tool break force limit assigned at a static value for all passes would be too high for the beginning passes or too low for passes toward the end of the machine tool life.

The present invention solves an additional drawback of prior art broken machine tool detection systems by its method of force averaging.

The voltage representing the instantaneous force value is sampled periodically. These samples are averaged over one revolution of the workpiece and the resultant average value is compared with the current limit value.

This method provides for a significant improvement in sensitivity to force value changes caused by tool wear or breakage while reducing the sensitivity to background noise and periodic variations in force due to workpiece rotation. For example, if a workpiece is out-of-round, the range of minimum force to maximum force over one revolution may be significantly higher than the difference between the current average force value and the break limit.

The invention treats the occurrence of a worn machine tool bit and a broken machine tool bit differently. Where the former condition occurs, the calculator means responsible for processing the force value array members and comparing them to tool force limits will allow the machining step to be completed, and will only then shut down the machine. On the other hand, when a broken tool is detected, the calculator means will immediately place the tooling machine into a "feed hold" condition.

Optionally, a graphic display may be incorporated into the invention, whereby each force value array member, learn ceiling, worn tool force limit and broken tool force limit may be graphed versus number of revolutions as an aid for the determination of wear constants, break constants and learn ceilings.

The invention now having been summarized, attention is directed to the drawings, wherein:

BRIEF DESCRIPTION OF THE DRAWINGS

FIG. 1 is a part elevational, part schematic view of the apparatus employed in the worn and broken tool system, using a hard turning machine as an example;

FIG. 2 is a elevational detail of the hard turning machine of FIG. 1 showing piezoelectric load cells and signal lines as shown in phantom;

FIG. 3 is a part elevational, part sectional view taken substantially along line 3—3 of FIG. 2;

FIG. 4 is a detail of one of the compound piezoelectric load cell assemblies employed in the apparatus shown in FIGS. 2 and 3;

FIG. 5 is an overall electrical schematic diagram showing a representative arrangement of electronic modules capable of carrying out the invention;

FIG. 6 is a schematic diagram of the analog module shown in FIG. 5.

DETAILED DESCRIPTION OF THE ILLUSTRATED EMBODIMENT

Figure 7:
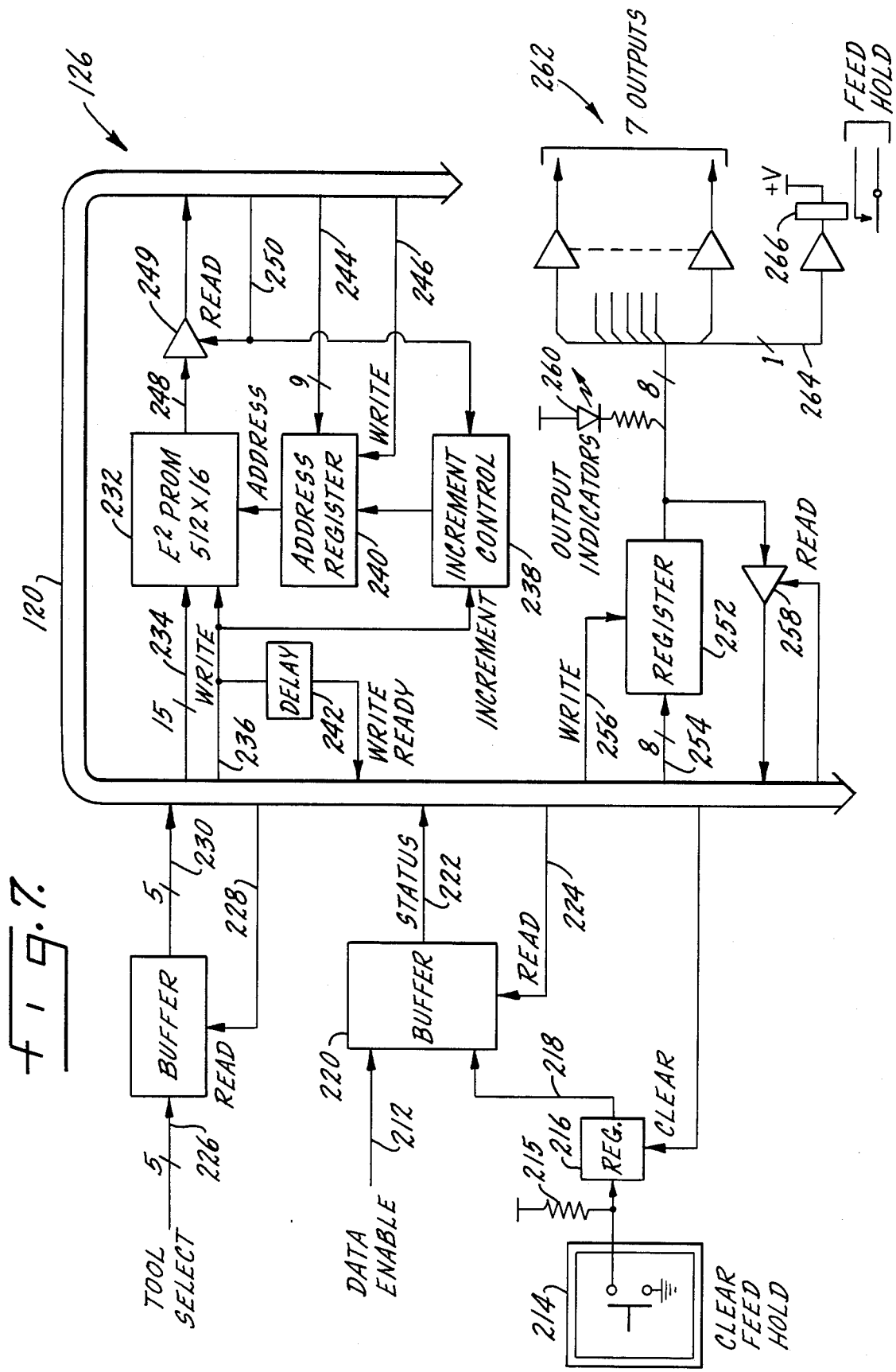
FIG. 7 is a schematic diagram of the digital module shown in FIG. 5.

Turning now to FIG. 1, a hard turning machine 10 is shown having a turning spindle 12, a workpiece W an axis drive motor 14 which gradually forces slide 16 in a leftward direction at a constant velocity, a pressure plate assembly 18 mounted on slide 16, a machine tool holder 20 mounted on pressure plate assembly 18, and a machine tool bit 22. Although a mechanical embodiment employing only one tool bit will be described for purposes of simplicity, it is to be understood that the invention may be used with a machine able to automatically select any of a plurality of tool bits in an automated sequence of machining steps.

When bit 22 makes contact with workpiece W, piezoelectric load cells 24 (FIG. 2) send a small-amplitude electrical signal or signals to amplifier package 26. The signals from the piezoelectric load cells 24 are amplified by amplifier package 26 into analog signals 28, and are transmitted to the monitoring apparatus 30. Monitoring apparatus 30, to be described in greater detail below, is responsible for processing the analog signals into force values. It receives a spindle signal 32 once per every revolution of the spindle, as well as certain status codes and the tool number from CNC (computer numerical control) machine 34. CNC machine 34 is also responsible for controlling the machining sequence to be automatically performed on the workpiece.

Monitoring apparatus 30 in turn issues a FEED-HOLD command to CNC machine 34 when it is desired to deactivate axis drive motor 14 from exerting force on workpiece W, and sends data to operator display 36 so that an operator might monitor operation of the system.

FIG. 2 shows the pressure plate assembly, piezoelectric load cells, tool holder and machine tool bit in more detail. Piezoelectric load cells 24 are distributed over an area of pressure plate assembly 18 in order to get an accurate force reading. When axis drive motor 14 presses slide 16 in a leftward direction, tool bit 22 begins cutting workpiece W. Workpiece W will exert resistive forces on tool bit 22. Force components $F_x$, $F_y$ and $F_z$ are shown. In this particular case, only $F_y$ and $F_z$ are appreciably significant force components. These force components are likewise exerted against each of load cells 24, producing a voltage across each load cell and a corresponding electrical signal within cable 43.

FIG. 4 shows a piezoelectric load cell 24 in more detail. In order to sense force in 3 directions, load cell 24 is divided into 3 wafers 38, 39 and 40. Each of wafers 38, 39 and 40 have a sensitivity to shear force in a direction corresponding to the x, y and z axis. Each load cell 24 has 3 output lines 45, 47, 49 carrying the resultant x, y and z signals respectively.

Returning to FIG. 2, four load cells are used in this example and are positioned in the corners of the pressure plate assembly. The x, y and z outputs 45, 47, 49 of each load cell 24 follow a cable way 42, and are in this embodiment connected in parallel with remaining load cell outputs. The paralleling of a plurality of piezoelectric load cells 24, in an arrangement as shown in FIG. 2 makes the resulting force measurement independent of the point where the force is applied. In this way a current related to the average force on the pressure plate assembly is obtained for each axis. X, y and z channel inputs proceed through cable 44 through amplifiers to an analog module 46, later described. Load cells used in one tested embodiment originate from Kistler Instrumente AG, of Winthertur, Switzerland.

Turning to FIG. 3, pressure plate assembly 18 has a front plate 48 mounted to machine slide 16 via pre-stressing bolts 50. In between front plate 48 and slide member 16 is middle plate 52, having a plurality of load cell recesses 54. Gaskets 56, of rubber or other suitable flexible material, are interposed between front plate 48 and middle plate 52. Machine tool holder 20 is attached to pressure plate assembly 18 via bracket 58 and bolts 59.

In order for the load cells to operate effectively, they need to be pre-stressed. Pre-stressing bolts 50 are tightened until the proper amount of pre-stress on each load cell 24 is obtained.

In FIG. 5 a schematic diagram is shown for the system of the invention using the CAMAC (Computer Automated Measurement and Control) module standard. A full description of the CAMAC standard can be found in the following publications: IEEE Std 583-1975; IEEE Std 595-1976; IEEE Std 596-1976; and IEEE Std 683-1976. These IEEE Standards are published by the Institute of Electrical and Electrical Engineers, Inc., 345 E. 47th Street, New York, N.Y. 10017.

In the embodiment illustrated in FIGS. 5-7, control over tooling machine 10 is exercised by a CNC (Computer Numerical Control) machine (not shown) separately from the system of the invention. The operations of the broken and worn machine tool detection system are, on the other hand, distributed between microcomputer 100 and I/O apparatus 101. A microcomputer suitable for use with the invention is Digital Equipment Corporation's LSI11. Connected to microcomputer peripheral bus 102 is microprocessor unit 104, random access memory (RAM) unit 106, and non-volatile memory unit 108. Microprocessor 104 executes the broken and worn machine tool program hereinafter described. Nonvolatile memory unit 108, which can be of the bubble memory type or a read-only memory (ROM), stores the instructions for the broken and worn tool detection program. Serial port 110 interfaces bus 102 with serial line 112, which may be of the RS232 configuration.

Line 112 in turn communicates with an operator's CRT terminal 114 and a hard copy device 116. CRT terminal 114 receives various messages as to the status to the machine tools being employed, and also displays a graph of the machine tool force versus number of revolutions. The force graph may also be printed by hard copy device 116. Alternately, CRT terminal 114 and hard copy device 116 may be replaced by a simple operator device where a graph of the force versus number of revolutions is not required.

CAMAC crate controller 118 serves as an interface between peripheral bus 102 and CAMAC dataway bus 120, which is configured according to the IEEE standards set out above. A crate controller suitable for incorporation into the invention is manufactured by KineticSystems Corporation, 11 Maryknoll Drive, Lockport, Ill. 60441. Connected to bus 120 are analog multiplexer 122, analog module 124 and digital module 126. Crate controller 118, analog multiplexer 122, and analog module 124, and digital module 126 as well as microcomputer may be contained into a single CAMAC crate which would then provide the physical mounting, power, and cooling and contain the dataway bus for the modules. Dataway bus 120 comprises an "N" line (station address); command lines by function and subaddress; unaddressed commands (Z, I, B); timing lines; data write lines; data read lines; Q and X response lines and a LAM (look-at-me) or "L" line. In this configuration, a Z command initializes registers or control functions in the module, I disables features for the duration of the signal, C clears registers or resets flipflops and a B status indicates that a dataway operation is in progress. Q and X responses are replies from the module to the crate controller that commands have been received or that the module can execute the commands received.

Piezoelectric transducers 24 produce signals which are transmitted on lines 128 to charge-sensitive amplifiers 26, which will amplify the signals fed from the force transducers 24. A signal from any of 16 charge amplifiers is available for analog multiplexer 122 to pass on to analog module 124. In order to select which signal will be monitored, microprocessor 104 will transmit a "select signal" command via crate controller 118 and bus 120 to analog multiplexer 122. Each x, y or z wafer (38, 39, 40; FIG. 4) is independently amplified by an amplifier 26 and is independently selected by multiplexer 122. A multiplexer suitable for incorporation into the invention is KineticSystems Corporation's model 3531.

Analog multiplexer 122 sends the selected, amplified transducer signal via analog output line 132 to analog module 124.

In FIG. 6, module 124 is shown in more detail with many groups or digital lines being separated as one line for clarity. The two inputs external to analog module 124 are the force signal on line 132 and a signal on line 134 from spindle interrupt signal generator 133. Signal generator 133 may take the form of a photocell mounted to sense each revolution of the spindle. The signal on line 134 is pulled up via resistor 136, cemented to logical level amplifier 138 and output to line 140. The force signal on line 132 is amplified by op amp 142 and is received by sample/hold buffer 144. The force signal may be sampled at a rate selected by the operator. The rate selected is written into register 146, through write data bus 148. Line 148 is connected to CAMAC dataway bus 120, as is write control line 152.

The output from register 146 is transmitted via bus 154 to sample clock 156, which sends a clocked pulse via line 158 to convert control element 160 at an interval ranging from 30 microseconds to 66.7 milliseconds in this embodiment. Convert control element 160 controls sample/hold buffer 144 and analog/digital converter 162. Upon transmission of a pulse from control element 160 via line 164 to sample/hold buffer 144, buffer 144 will sample the force signal and make it available to analog/digital converter 162 via line 166. At the same time, control element 160 sends a convert signal via line 168 to the analog/digital converter 162.

The convert signal on line 168 initiates the conversion of the analog signal on line 166 to a 12-bit digital signal, which in turn is sent to totalizer 170 on bus 171. Totalizer 170 should be at least a 19-bit full adder and accumulator. At the same time that analog/digital converter 162 makes the digitally represented force available to totalizer 170, it transmits a ready signal via line 172 to count control element 174 then increments the sampling count by one by tranmitting a signal to conversion counter 176, enables totalizer 170 to add the digital data to the current sum by transmission of a signal on line 178, and sends a signal via line 180 to AND gate 182.

Gate 182 ANDs the interrupt signal on line 140 with the count control signal on line 180 to in turn send a signal on line 184 to interrupt control element 186. Control element 186 generates a look-at-me (LAM) interrupt signal on line 188 back to dataway bus 120 and eventually to crate controller 118. The LAM is cleared via line 190 from crate controller 118. A test line 192 completes the connections of interrupt control element 186 to dataway bus 120.

The spindle interrupt signal is also carried on line 140 to one-word buffer 194, one-word buffer 196 and delay element 198. The communication of the spindle interrupt signal to one-word buffer 194 loads the total count since the last spindle interrupt into buffer 194 from counter 176 via line 200. The Spindle interrupt signal will likewise cause one-word buffer 196 to be loaded with the digital representation of the totalized force from totalizer 170 via line 202. The interrupt signal, as delayed by delay element 198, will reset conversion counter 176 and totalizer 170 so that they may respectively sum sample counts and digital force values for the next period between interrupts.

In response to the LAM signal on 188, microprocessor 104 will read buffer 194 by using line 204, with the data appearing or bus 206, and will read the totalized force by using line 216, with the data appearing on bus 208.

An analog module suitable for use as the analog module 124 described is analog module 3780A from Kinetic-Systems Corporation.

Digital module 126 is shown in more detail in FIG. 7. One portion of digital module 126 stores the status of tooling machine 10. A data enable signal on line 212 is issued by the CNC machine (not shown) when the machine tool being employed nears the workpiece. Clear feed hold button 214, not a portion of the module, is pressed by the machine tool operator after a broken or worn tool bit has been replaced. The clear feed hold signal is stored in register 216 after being pulled up by resistor 215. The output on line 218 from register 216 is stored, together with the data enable bit from line 212 in buffer 220. Buffer 220 when commanded by microprocesor 104 via Read line 224, outputs a status word on bus 222 indicating whether the data enable and clear feed hold conditions are true.

The CNC machine also indicates which tool is being used via bus 226 in a 5-bit word. The tool identifier is read through a command by microprocessor 104 on line 228, and is output on bus 230. E²PROM 232 contains, for each possible machine tool, a reference to the piezoelectric load cell used, the learn ceiling, wear limit, wear increment, break limit, and break increment. Data is input on path 234 in connection with write control line 236. Write control line 236 also causes increment control element 238 to increment address register 240 by one and will, after a delay caused by delay element 242, signal microprocessor 104 through dataway 120 that it may write the next data word to the particular address. The base address for each tool is written via bus 244 in connection with write control line 246. In this way, E²PROM 232, which is conveniently dimensioned 512×16, contains an array of constants for each machine tool which may be employed. The constants stored in E²PROM 232 are output on bus 248 to buffer 249 in response to a read control signal on line 250 from microprocessor 104.

The code for the selected tool on bus 230 is used by microprocessor 104 to select the proper analog input line.

Microprocessor 104 monitors the condition of the machine tool being employed as will be described hereunder. Possible machine conditions include LEARN, RUN, BREAK, WEAR, FEEDHOLD, and DE (data enable). LEARN like each other of these conditions, is recorded in one bit of a TLFLAG word, which is written into register 252 via 8-bit data bus 254 in response to a write command from microprocessor 104 transmitted via line 256. The TLFLAG word is issued back to microprocessor 104 via buffer 258. According to the contents of TLFLAG, any of 7 output LED indicators 260 will light up, and any of 7 outputs 262 (6 of which are activated by a LEARN, RUN, BREAK, WEAR, FEEDHOLD, or DE condition, respectfully) will be activated. When the FEEDHOLD bit in TLFLAG is true, a signal is sent via line 264 to the coil of relay of 266, which will operate to stop machine tool slide 16 from further exerting force on the workpiece.

Although representative analog and digital electronics modules have been shown that are suitable for incorporation into the invention, other arrangements might be easily thought of which perform the same functions. The decentralized totalization of force readings by totalizer element 170 (FIG. 6) is preferred because it reduces system overhead on microprocessor 104. This is because of the extremely fast (up to once every 30 microseconds) turnaround time in force summing.

Having described in detail a mechanical embodiment of the invention and implementing electronics, one embodiment of software necessary to operate the invention will now be described. The software version described is for a plurality of machine tools operated by one CNC machine, which software further provides a graphing utility whereby force versus revolution number may be graphed both on a CRT terminal and a hard copy device, together with appropriate wear and break limits. Alternate embodiments of the software can easily be thought of for an application employing only one machine tool, or where only an operator's display as to tool status is needed rather than a full graphing utility.

Figure 8:
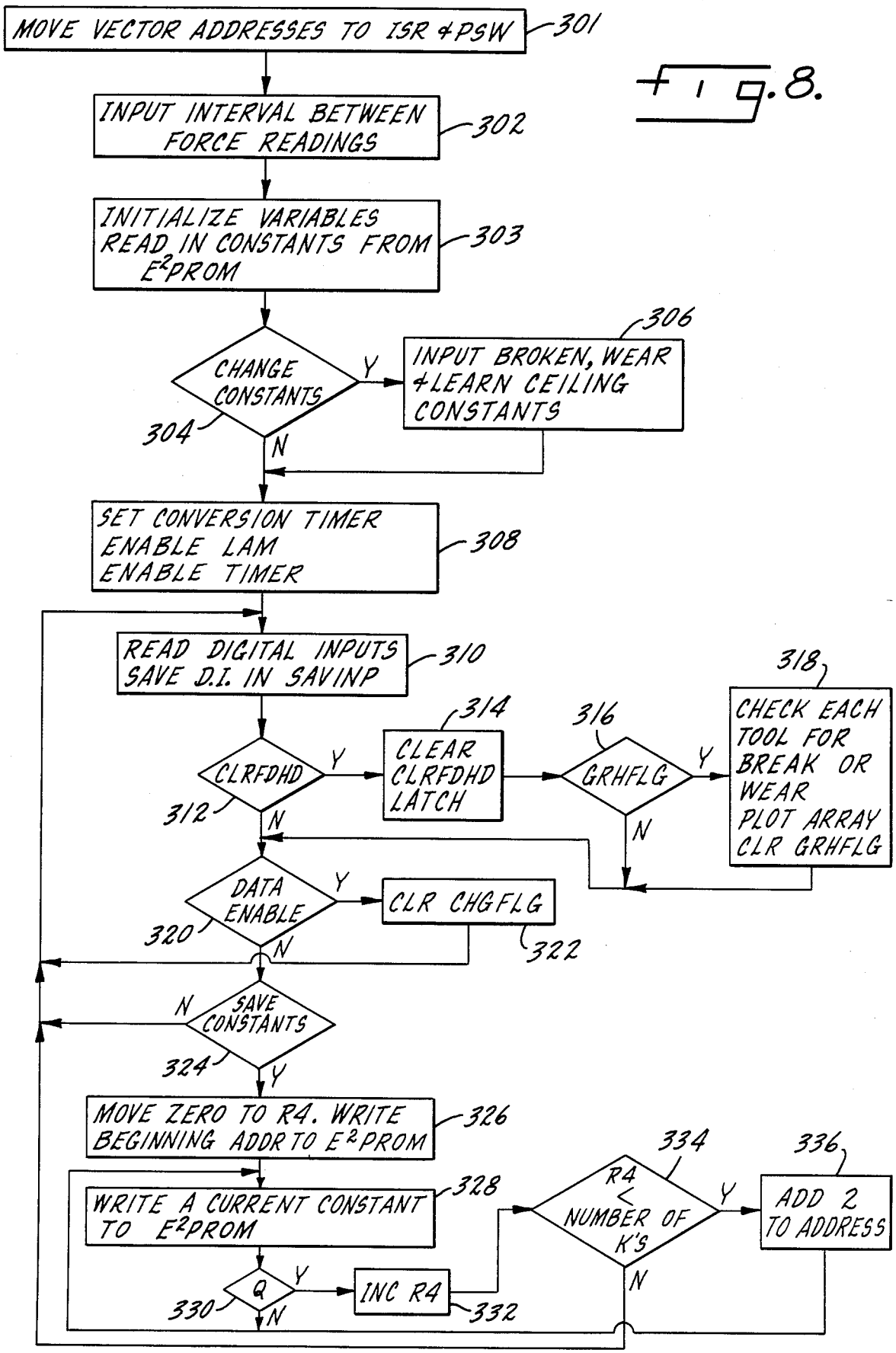
FIG. 8 is a flowchart of the top loop of a monitoring and controlling program according to the invention.

Turning now to FIG. 8, a flowchart for the top loop of the above described software is depicted. After CNC machine startup, step 301 moves the interrupt service routine address and the processor status word into the vector address locations. This makes sure that no other routine except the bottom loop of the program (described in FIG. 9) can interrupt the top loop. The vector address will point the system interrupt to the subroutine embodied in FIG. 9 in the event an interrupt occurs.

At step 302, the interval between force readings is input into register 146 (FIG. 6). This interval may range from 30 micro-seconds to 66.7 milliseconds, and will determine the number of times the force readings are sampled per any one revolution of spindle 12. Step 303 initializes variables and reads in various constants, such as the break and wear constants and wear ceilings, from E²PROM 232 (FIG. 7). Decision 304 asks whether the previously stored constants should be changed. If the operator indicates YES, the wear limit, wear limit increment, break limit increment and learn ceiling constant can be changed. At 308, microprocessor 104 sets conversion timer 156 (FIG. 6) and also enables the receipt of a LAM signal from line 188.

Next, the digital inputs are read at 310 from buffer 220 (FIG. 7) and are saved at SAVINP, a memory location. These digital inputs include data enable (DE) and clear feed hold (CLRFDHD). At 312, CLRFDHD is tested to see if the operator has cleared the last occurring FEEDHOLD condition. If it is true, CLRFDHD latch 216 is cleared at 314 via a command sent on line 217 (FIG. 7). At 316, a bit called GRHFLG is checked to see if it has been set. If it has, microprocessor 104 will plot an array of force readings taken during the most recent pass of the machining operation and will clear GRHFLG at 318.

At 320, the program checks to see whether DE has been set. If it has, the program clears a bit called change flag (CHGFLG) at 322 and returns. Otherwise, the program next asks whether the constants last entered should be saved at 324; if not, the program returns to 310.

If the various broken, wear, and learn constants are to be saved, the program begins to write these constants into E$^2$PROM 232 at 326 (FIG. 7) via data line 234. At step 326, 0 is moved into internal register R4 and a beginning address is written into E$^2$PROM 232 via address register 240 (FIG. 7). At 328, a current constant is written into E$^2$PROM 232 at the current address. At 330, the Q response from E$^2$PROM 232 is tested to make sure that the data has been received. The program loops if the Q response is negative and increments internal register R4 at 332 if the Q response is positive.

At 334, the contents of internal register R4 are compared against the number of constants to be written to E$^2$PROM 232. If the number of constants is greater, further constants are to be written. Two is added to the E$^2$PROM address at 336 via increment control element 238 (FIG. 7) at 336, and the program loops to write a next constant. If no other constants are to be sound, the program loops back at step 310.

Figure 9A:
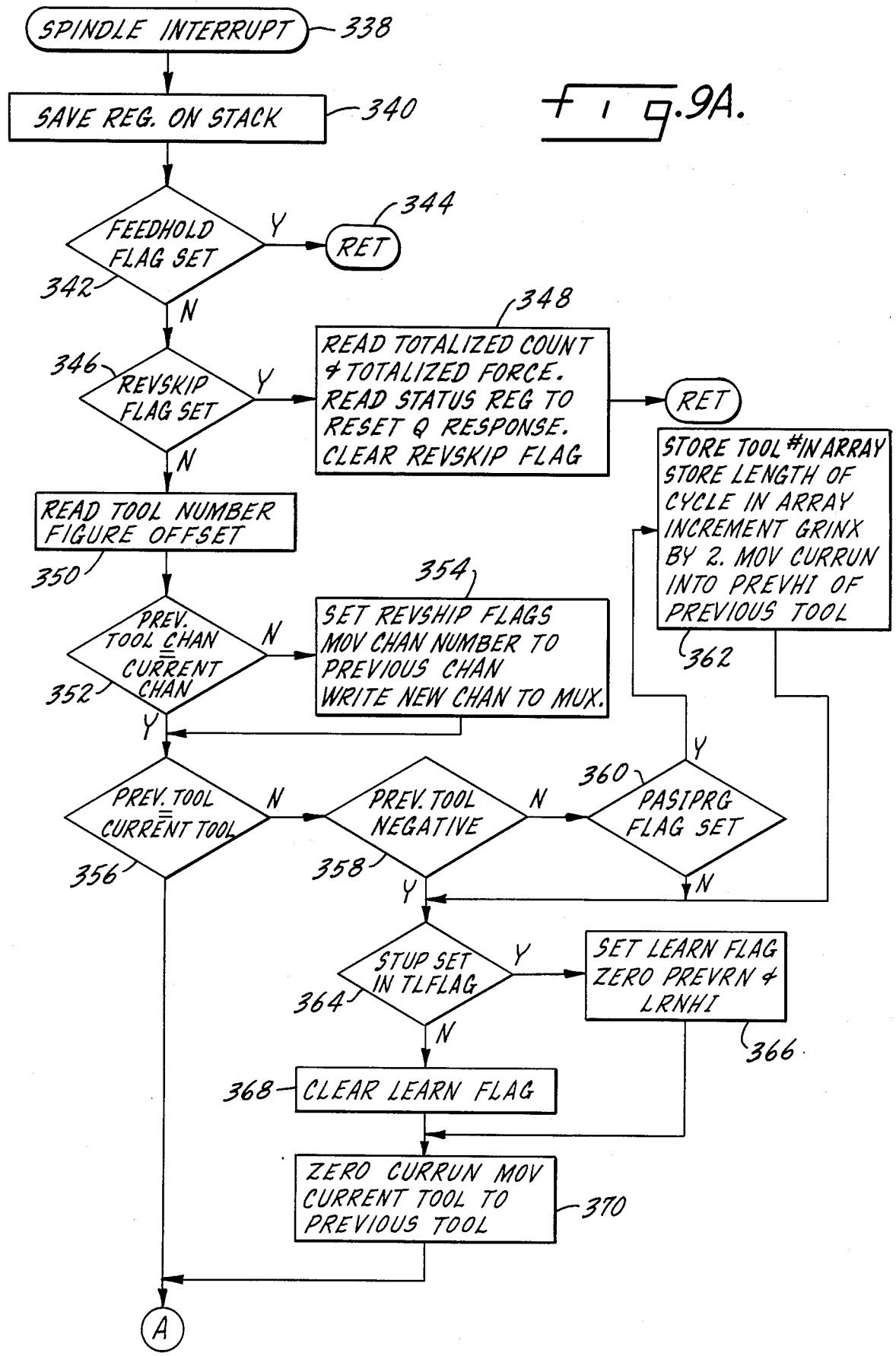
FIGS. 9a, 9b and 9c comprises a flowchart for the bottom loop of said monitoring and controlling program.
Figure 9B:
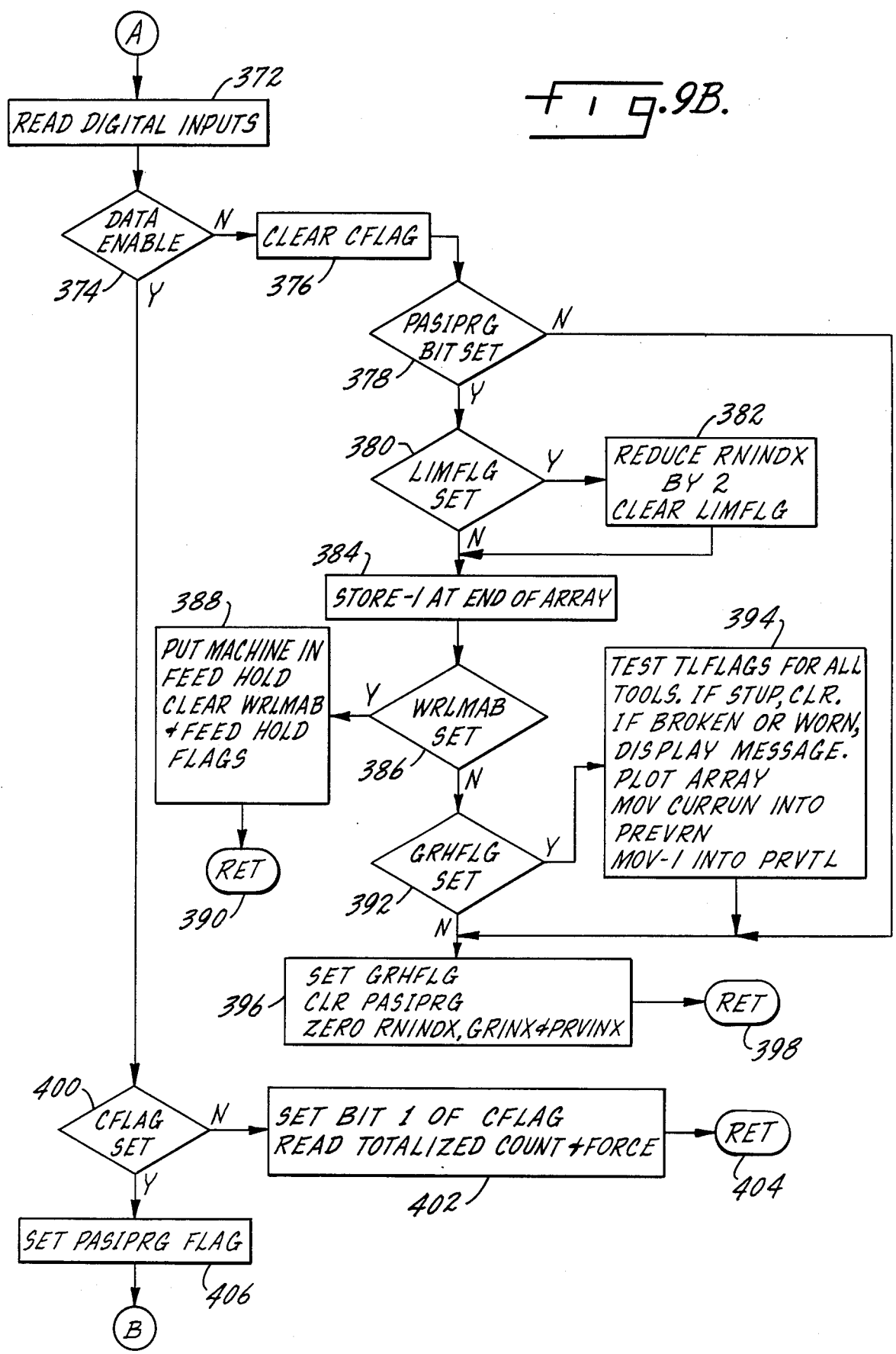
Figure 9C:
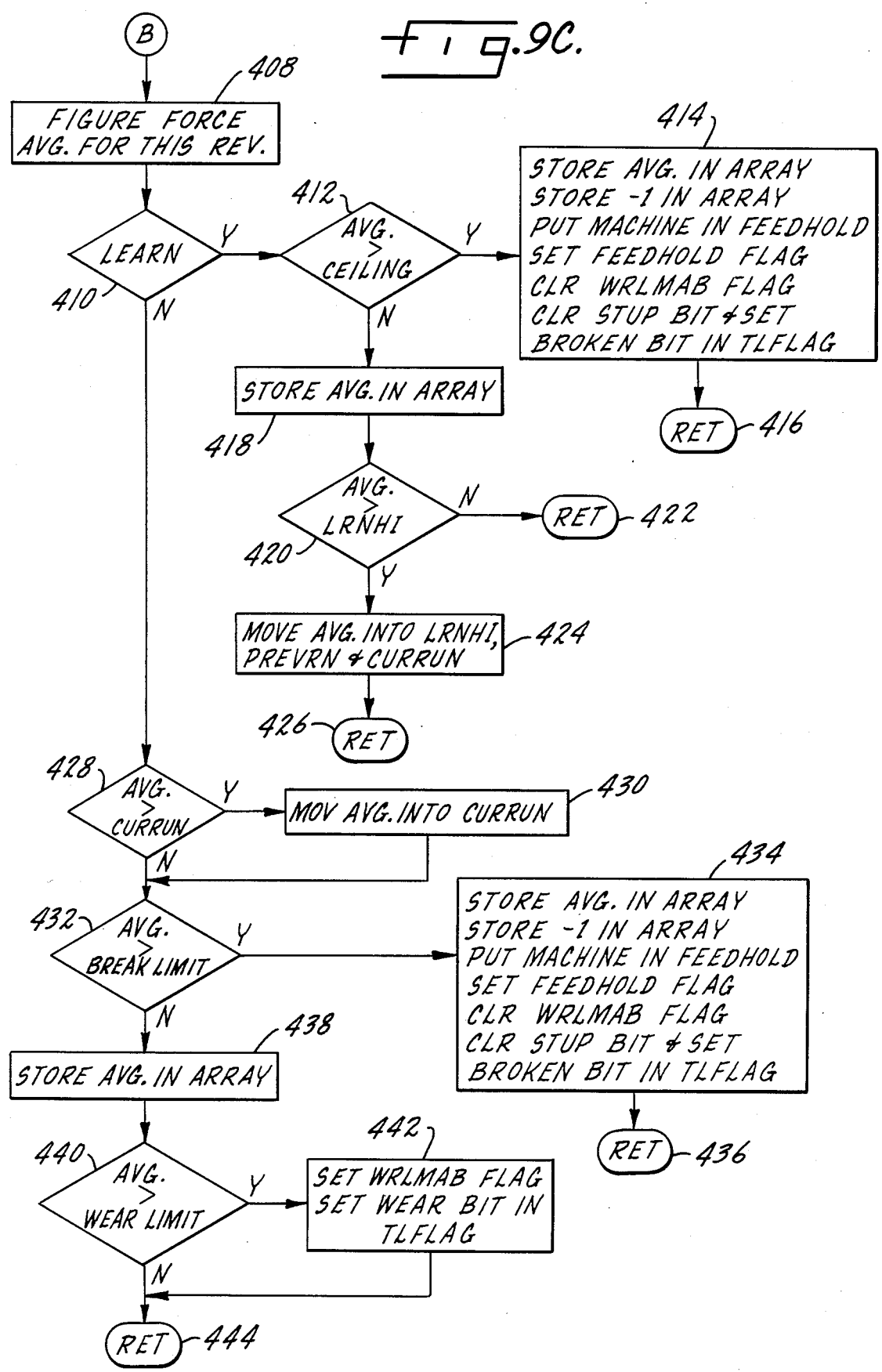

FIGS. 9A, 9B and 9C illustrate the bottom loop of the program, which is executed each time spindle interrupt generator 133 (FIG. 6) sends a signal to analog module 124. After a spindle interrupt is received at 338 (FIG. 9A), the contents of the program counter and processor status word present during the execution of the top loop are saved on a stack at 340.

The program next tests the state of the FEEDHOLD flag at 342. If FEEDHOLD is true, this indicates that the machine has been stopped pending the removal of a worn or broken machine tool, and the program returns execution at 344 to top loop where it was interrupted (FIG. 8).

If FEEDHOLD is not true, the program next tests whether the REVSKIP flag has been set at 346. REVSKIP is set when a change of the multiplexer channel from one amplifier signal to another has been made, and causes the program to skip one revolution of force readings. Where REVSKIP is set, the program at 348 reads the totalized count and totalized force from registers 194, 196 (FIG. 6), and clears the REVSKIP flag. The program then returns execution to top loop where it was interrupted. Where the REVSKIP flag has not been set, the program next at 350 reads the tool number being used from tool select buffer 229 (FIG. 7) and figures the correct offset for the E$^2$PROM address in order to access the corresponding learn, break and wear constants.

The program next determines at 352 whether the previous tool channel (that is, the tool channel used during the last recorded spindle revolution) is equal to the current channel. If it is not, the REVSKIP flag is set at 354 so that the current revolution period of information will be ignored, since the force readings would be for the wrong channel tool. The current channel number is moved to the previous channel number, and the new channel number is written to multiplexer 122 (FIG. 5).

It is possible that for any one channel, there might be several tools used, so the program next asks at 356 whether the previous tool is equivalent to the current tool. If it is not, the program will then ask at 358 whether the previous tool variable is negative. This condition occurs when the CNC is at the beginning of a machining operation or pass, and that therefor there has been no previous tool during this pass.

In the case that the previous tool is not negative the program next asks at 360 whether the PASIPRG (pass in progress) flag has been set. If it has been set, the current tool number is stored in an array at 362, as well as the length of the current cycle. GRINX, a graph index variable, is incremented by 2. CURRUN, a variable storing the highest force value for the current machining step, is moved into the PREVHI, a variable storing the previous force value high for the previous tool.

Next, the program asks at 364 whether STUP (start up bit) has been set in TLFLAG, a group of software flags in the microcomputer. If STUP has been set, the LEARN flag is set and the variables PREVRN and LRNHI are zeroed. If STUP is not set, the LEARN bit is cleared at 368 so that the learn ceiling will not be used as a force limit in any but the first pass. Thereafter CURRUN is zeroed at 370 and the current tool number is moved to the variable storing the previous tool number at 370.

At 372 (FIG. 9B), the contents of buffer 220 (FIG. 7), containing the digital inputs, are read. At 374, the program checks whether DE is true, and therefor determines whether the tool bit has engaged the workpiece. If DE is not true, a variable called CFLAG is cleared at 376. As will be detailed below, CFLAG is set when DE has just become true. The setting of CFLAG causes the first revolution of data to be ignored by microprocessor 104.

If DE is not true, the program further tests whether PASIPRG is set at 378. If it has been set, indicating that a machining operation is in progress, the program will next ask at 380 whether or not the bit called LIMFLG has been set, indicating that no more force values can be stored in a certain buffer. Where LIMFLG is set, RNINDX, a variable name for the current force array address number, is reduced by 2 at 382 and LIMFLG is cleared. Then, a −1 is stored at the end of the force array at 384.

The program next tests to see if WRLMAB (wear limit abort) has been set at 386. The setting of this flag indicates that a tool is worn, and that the machine should be put on feedhold. If WRLMAB has been set, the CNC is put on feedhold at 388 by the issuance of a FEEDHOLD command via relay 266 (FIG. 7); the WRLMAB and feedhold flags are also cleared. Since the branch in which WRLMAB is tested is not accessed until DE is not true, a FEEDHOLD based on a worn tool bit will be issued only after the completion of a machining step. The delay in issuing a FEEDHOLD command in this instance allows the workpiece to be machined completely through a machining step, rather than wasting the workpiece by only machining it partially through a step.

After the FEEDHOLD command is issued, the program at 390 returns execution to the top loop at the point where it was interrupted (FIG. 8). If WRLMAB has not been set, the program will next ask whether GRHFLG has been set at 392. GRHFLG is a indication that a force array is to be plotted. If GRHFLG has been set, the program tests the TLFLG words for all tools. These are software flags in computer mnemory. If the broken or worn bits in a TLFLG word are set, an appropriate message is written out on CRT display 36. If the start up bit is set, it is cleared at 394. Also a force array is plotted, variable CURRUN is moved into PRE RUN; and −1 is moved into PRVTL. Thereafter, variable GRHFLG is set at 396, PASIPRG is cleared, and address variables RUNINX, GRINX and PRVINX are zeroed. The program then returns at 398.

Returning to decision 374, if DE is true, the program next determines at 400 whether or not CFLAG has been set. If CFLAG has not been set, indicating the force array data is for the first revolution and should be ignored, CFLAG will be set at 402 and the totalized count and force will be read in order to clear the count and force buffers without causing a "loss of data≠(Q not true) message. The status register is also read for resetting the Q response. Program control then returns to top loop (FIG. 8) at 404.

If CFLAG has been set, indicating that the data is valid, the PASIPRG flag is set at 406. At 408 (FIG. 9b), microprocessor 104 reads the totalized force available on line 208 (FIG. 6) and the conversion count on line 206 and determines the force average for this revolution.

At 410, the program checks the LEARN flag to find out whether or not the CNC is in a learn cycle, i.e., whether or not this is the first workpiece to be cut in a series of similar workpieces by the same machining operation. If LEARN is true, the program next checks at 412 whether or not the average calculated at 408 exceeds the learn ceiling for the current tool. Learn ceilings for each machining step of the operation are previously, established by the operator, based on prior experiences of what the force levels could be expected to be.

If this force average does exceed the ceiling, the average is stored in the force array followed by a −1, and the machine is put in feedhold, all at 414. Also at 414, the FEEDHOLD flag is set, the broken bit in TLFLAG is set, and the STUP bit in TLFLAG is cleared; the WRLMAB flag is also cleared. The program then returns control to the top loop at 416. In the more usual case where the force average calculated in 408 does not exceed the ceiling at 412, the force value is merely stored in the corresponding force array at 418.

Still under the LEARN branch of the program, the program next asks at 420 whether or not the force average calculated at 408 exceeds the value stored in LRNHI, the variable equal to the highest force value for that machining step during the first machining operation. If the force average does not exceed LRNHI, the program returns at 422; if the force average does exceed the old LRNHI, LRNHI is equated to the current force average at 424, as well as PREV RN and CURRUN. The program then returns at 426.

If the LEARN variable is not true at 410, this indicates that a machining operation subsequent to the first is being performed. Under this branch, the force average is compared to CURRUN at 428 to determine whether or not it exceeds the current highest force value for that machining step of the current machining operation. If it is, the force average is moved into CURRUN at 430.

Next, the force average is compared against the break limit for that tool and pass at 432. The break limit has been figured by microprocessor 104 as equal to PREV-RUN for this tool plus a corresponding break limit increment constant stored in $E^2$PROM 232. Where the break limit is exceeded, the machine is immediately put in feedhold at 434, the feedhold flag is set, the WRLMAB flag is cleared; the start up bit is cleared and the broken bit is set in TLFLAG. The force value is stored in the force array and −1 is also stored in the array to mark its ending, also at 434. The program then returns at 436.

If the break limit is not exceeded, the force value is merely stored in the array at 438, and the force value is next compared against the wear limit at 440. The wear limit for any one machining step is calculated by microprocessor 104 as being equivalent to LRNHI for that step plus a previously stored wear limit increment constant. Where the average does exceed the wear limit, the program sets the WRLMAB flag, but does not immediately generate a feed hold condition, at 442.

If the force average at 440 does not exceed the wear limit, the program returns execution to the top loop at 444.

Figure 10:
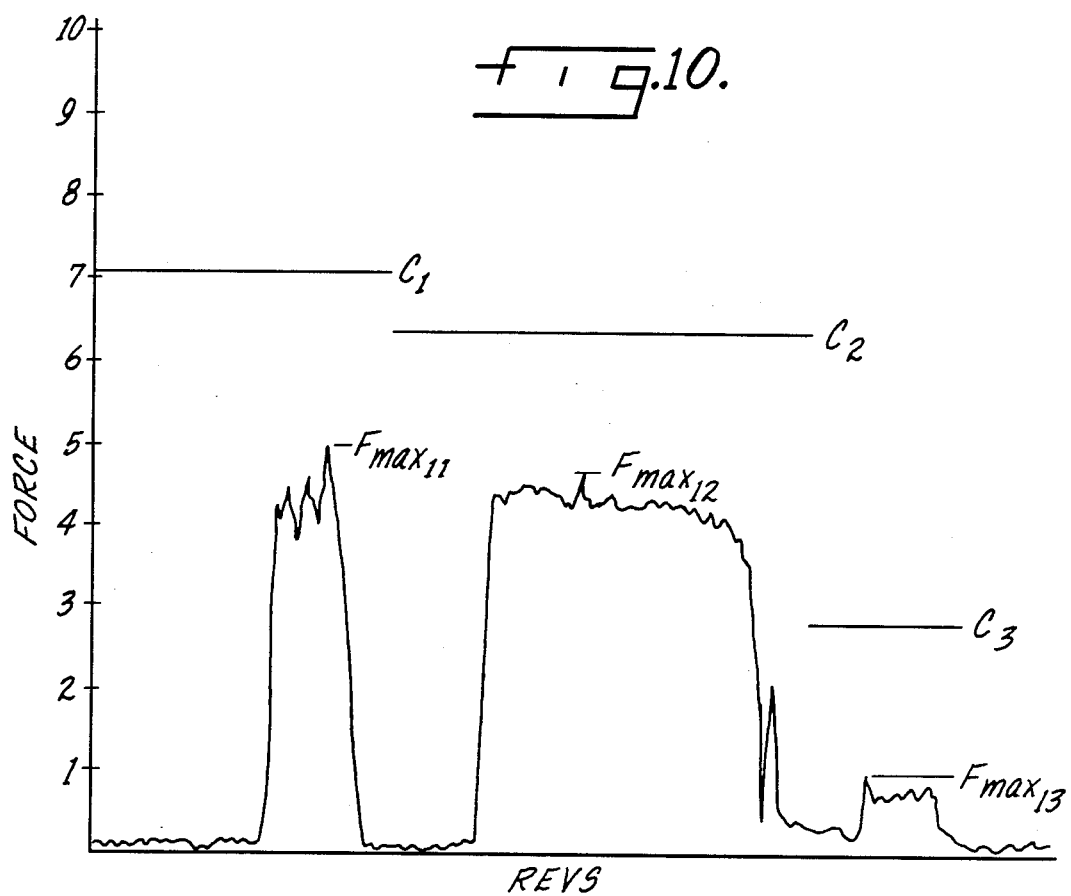
FIG. 10 is a graph of the force exerted on a first workpiece with respect to the number of revolutions of workpiece rotation, also showing predetermined force ceilings for 3 different machining steps.
Figure 11:
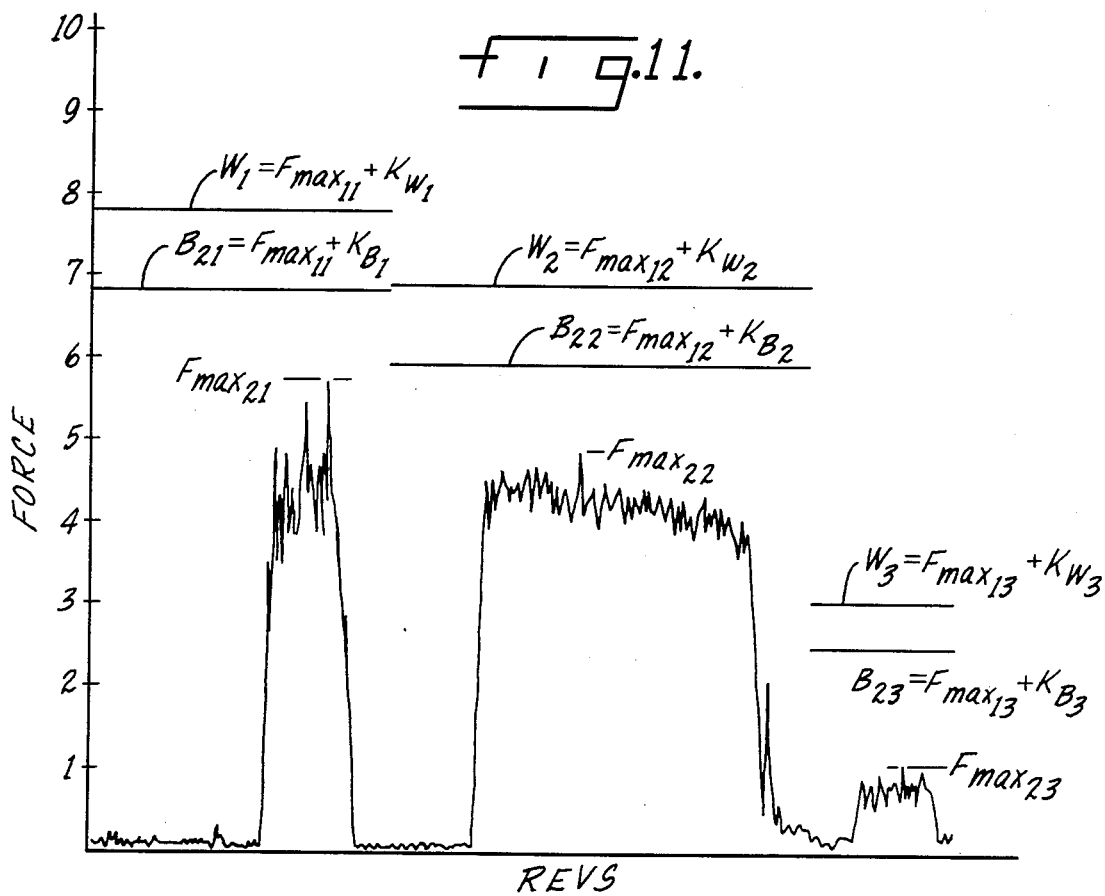
FIG. 11 is a similar graph for force exerted on a second workpiece for the same 3 machining steps, the graph also showing wear and break force limits for each machining step.
Figure 12:
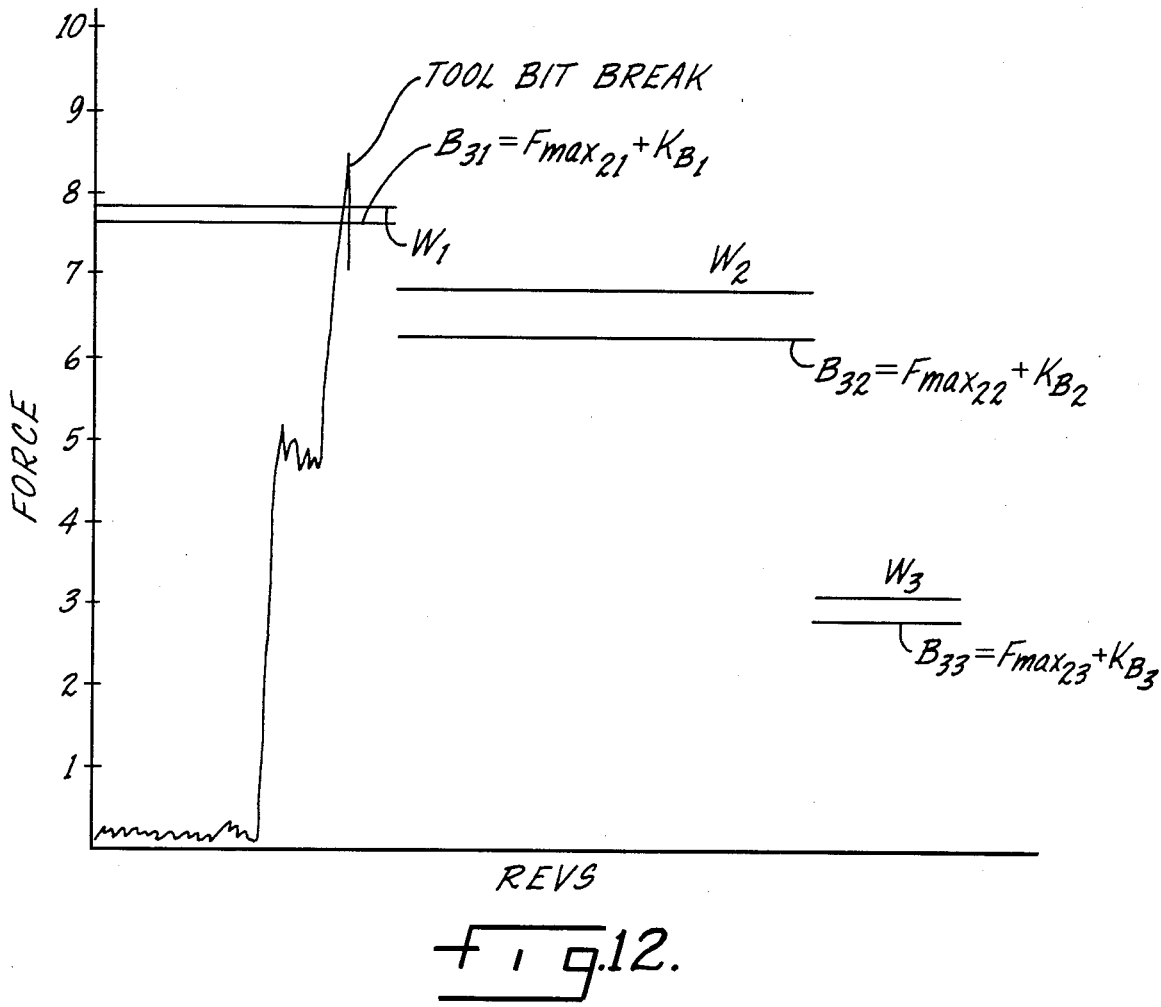
FIG. 12 is a graph of force versus revolution for a third workpiece, showing wear and break limits for the third pass and the occurrence of a broken bit condition.

FIGS. 10, 11, & 12 represent plots of the stored force array verse revolution number for a particular machining operation in successive passes, as it would appear on CRT terminal 114 and/or hard copy device 116 (FIG. 5).

FIG. 10 shows a hypothetical force versus revolution plot for the first pass of a machining operation, containing 3 machining steps. During the machining of the workpiece, 3 peaks are produced one for each machining step, containing force maxima $Fmax_{11}$, $Fmax_{12}$, $Fmax_{13}$. The plot also shows corresponding limit ceilings $C_1$, $C_2$, and $C_3$, which serve as a protection against damage in the first, or learn, pass of the operation.

FIG. 11 shows a force array plot for this same machining operation on a second successive workpiece. From the force maxima learned by this system during the learn pass, wear and break limits ($W_1$, $B_{21}$, $W_2$, $B_{22}$, $W_3$, $B_{23}$) are established for this next pass and are here shown as horizontal lines. As plotted, the force array shows peaks which are somewhat higher than the peaks generated in the preceding pass, and the peaks contain force maxima $Fmax_{21}$, $Fmax_{22}$, and $Fmax_{23}$ which are somewhat higher that the maxima obtained in the first pass. This phenomenon is caused by an increment of wear on the corresponding machine tools.

As established, the wear limits $W_1$, $W_2$, and $W_3$ will remain the same for all successive passes of the machining step. However, break limits $B_{21}$, $B_{22}$ and $B_{23}$ are unique for this pass, as they are recalculated based on the previous force maxima plus increment constants $K_{B1}$, $K_{B2}$ and $K_{B3}$.

Turning to FIG. 12, a partial force plot is shown for a third repetition of the machining operation. Wear limits $W_1$, $W_2$ and $W_3$ remain the same, but break limits $B_{31}$, $B_{32}$ and $B_{33}$ are calculated based on the force values obtained during the last pass. This plot also shows what happens if a broken bit occurs. A sharp spike, much higher than the background peak from which it emanates, exceeds the current break limit barrier, causing the system to generate a feedhold command and stopping the machine. When a machine tool bit becomes progressively worn, the force value generated in successive passes approaches the wear limits, finally exceeding those wear limits. The type of protection given by constant wear limits is appropriate for progressively increasing forces, as is the recalculation of break limits due to the always-occuring sharp peak above the background in force value generated when a machine tool breaks.

We claim:

1. In a method for detecting worn or broken machine tools using apparatus comprising a number of machine tools, machine tool drive means, means to translate a force exerted on any of the machine tools by the drive means into a signal, and automatic calculator means, the automatic calculator means being operably connected to the force translation means to receive the signal, and operably connected to the machine tool drive means so as to be capable of commanding the machine tool drive means to cease exerting force a machine tool from a workpiece whenever the force exceeds a tool wear force limit, a tool break force limit or a tool force learn ceiling, the steps of:

(a) storing a predetermined tool force learn ceiling, tool wear limit factor and tool break limit factor in the automatic calculator means for each machine tool;

(b) determining the identity of a machine tool to be first used;

(c) retrieving the tool force learn ceiling, tool wear limit factor and tool break limit factor from a memory in the automatic calculator means for said first tool;

(d) actuating the machine tool drive means to cause the first machine tool to exert a force on a first workpiece the first machine tool performing a first step in a machining operation;

(e) sensing and translating the force into a force signal using the force translating means;

(f) receiving and periodically processing the force signal into a member of a first set of force values using the automatic calculator means;

(g) comparing the force value member against the tool force learn ceiling;

(h) commanding the machine tool drive means to cease exerting force on the first workpiece if the force value member exceeds the force learn ceiling;

(i) repeating steps (e)-(h) for all members of said first set of force values until the performance of the first step on the first workpiece is complete or until the force learn ceiling is exceeded;

(j) determining the largest force value in the first set of force values;

(k) incrementing said largest force value by the current tool wear limit factor to obtain a first tool wear force limit, and storing the first tool wear force limit;

(l) incrementing said largest force value by the first tool break limit factor to obtain a first tool break force limit for a second workpiece and storing said first tool break force limit;

(m) repeating steps (b)-(l) for a number of remaining machine tools and machining steps necessary to complete the machining operation on the first workpiece;

(n) performing the first step of the machining operation on a second workpiece using the machine tool drive means and the first machine tool;

(o) sensing the force exerted on the first machine tool by the machine tool drive means using the force translating means;

(p) translating the last said force into a force signal using the force translating means;

(q) identifying the first machine tool and retrieving the first tool wear force limit and the first tool break force limit, the break force limit being for the second workpiece;

(r) receiving the last said force signal using the automatic calculator means, and periodically processing and storing the force signal as a member of a set of force values for the first tool and second workpiece;

(s) comparing the force value member to the first tool wear force limit and the last said first tool break force limit;

(t) commanding the machine tool drive means to cease exerting force on the second workpiece if the last said force value member exceeds the first tool wear force limit or the last said first tool break force limit;

(u) repeating steps (r)-(t) until the first tool has performed its portion of said machining operation on the second workpiece or until a member of the last said set of force values exceeds the first tool wear force limit or the last said break force limit;

(v) determining the largest force value member for the first tool and second workpiece;

(w) calculating the first tool break force limit for the next workpiece as being equal to the last said largest force value member incremented by the first tool break limit factor;

(x) repeating steps (o)-(w) for the number of machine tools necessary to complete the machining operation; and (y) performing steps (n)-(x) for a number of subsequent workpieces, the greatest force value member for a particular tool and current workpiece being used to calculate the break force limit for that particular tool and the next workpiece.

2. The method of claim 1 wherein said apparatus is further characterized in that the workpiece being operated upon by said machine tools is caused to rotate about an axis, the method further including the steps of:

(z) receiving said force signal a plurality of times for each full rotation of the workpiece from said force translation means using said automatic calculator means;

(aa) counting the number of times the force signal is received by the automatic calculator means during each said full rotation;

(bb) converting each said force signal into a force value; and (cc) calculating one of said members of said set of force values array for each workpiece rotation from the average of said force values received during said rotation.

3. The method of claim 1, wherein said apparatus further comprises means for graphing said force value sets with respect to revolution number and as compared to said wear and break force limits, the method further including the steps of:

(y) after said machining operation has been interrupted because a force value member exceeds a force limit, or has been completed on any workpiece, graphing the corresponding force value sets with respect to time for each machine tool used in said operation; and (z) graphing said wear force limit and said break force limits for each machine tool.

4. The method of claim 1, further including the steps of:

(y) after actuating said machine tool drive means but before processing said force signal into a member of a force value set, awaiting receipt of a data enable signal by said automatic calculator means from data enable signal generating means;

(z) discarding said received force signals as long as the data enable signal is not being received by the automatic calculator means; and (aa) processing said received force signals for substantially as long as the data enable signal is being received from the data enable signal generating means by the automatic calculator means.

5. The method of claim 1, further comprising the step of:

(z) after said automatic calculator means has determined that a wear limit has been exceeded, waiting until the corresponding machine tool has completed its portion of said machining operation before commanding said machine tool drive means to cease exerting force on the current workpiece.

6. In an apparatus for the detection of worn or broken machine tools, the apparatus including a number of machine tools, machine tool drive means capable of serially applying machine tools to a workpiece in a number of machining steps constituting a machining operation, means translating a force applied by any machine tool to the workpiece into a signal, means transmitting the signal, automatic calculator means capable of selecting and receiving said signal and capable of commanding the machine tool drive means to cease applying a machine tool to the workpiece, the improvement comprising:

memory means associated with the machining step automatic calculator means, the memory means capable of storing for each a worn tool limit factor, a broken tool limit factor, a worn tool force limit, a broken tool force limit, a learn cycle force limit, a first array of force value members derived from the receipt and periodic processing of said signal by the automatic calculator means for a first workpiece and subsequent arrays of force value members derived in a like manner for subsequent workpieces;

the automatic calculator means comparing for each machining step each member of said first force value array to the learn cycle force limit for that machining step, the automatic calculator means commanding the machine tool drive means to cease applying a corresponding machine tool to the workpiece in the event that any member of said first force value array exceeds said learn cycle force limit;

the automatic calculator means for each machining step determining a largest member of said first force value array, using said largest member and a previously stored worn tool limit factor to obtain the worn tool force limit for that machining step;

the automatic calculator means, for each machining step, using said largest member of a force value array for a current workpiece and a previously stored broken tool limit factor to obtain as the broken tool force limit for that machining step as applied to the next workpiece;

the automatic calculator means, for each machining step as applied to any subsequent workpiece, receiving and periodically processing said signal into a corresponding subsequent array of force values;

the automatic calculator means comparing each member of the last said subsequent array to said worn tool force limit and a current broken tool force limit for that machining step, and commanding said machine tool drive means to cease applying the corresponding machine tool to said subsequent workpiece in the event that any member of the last said subsequent array exceeds the worn tool force limit or the current broken tool force limit for that machining step.

7. The apparatus of claim 6, further characterized in that each of said workpieces performs a periodic motion with respect to said machine tool employed in any machining step, signal generating means transmitting a periodic signal to said automatic calculator means in response to the completion by a workpiece of a period of each motion, the automatic calculator means, upon its receipt of said period signal, processing the signal from said force translation means into a member of a force value array, the automatic calculator means comparing the force value array member to a worn tool force limit and a broken tool force limit before the receipt of a further periodic signal.

8. The apparatus of claim 7, wherein the processing of said signal from said force translation means into a member of said force value array is further characterized in that said automatic calculator means processes said force signal into a force value a plurality of times between the receipts of said periodic signal, the automatic calculator means averaging said force values over the number of times said force signal is processed to derive said member of said force value array.

9. The apparatus of claim 7, further characterized in that the frequency of said workpiece motion relative to said machine tool ranges from about 10 to about 133 cycles per second.

10. The apparatus of claim 9, further characterized in that said automatic calculator means may sample and process said force signal at a rate up to once every 100 microseconds.

* * * * *